(No Model.)

M. WHEELER.
COMBINED STAND FOR STRAINERS AND TEA AND COFFEE POTS.

No. 564,462. Patented July 21, 1896.

Witnesses
F. L. Oyraud

Inventor
Mollie Wheeler.
By  
Attorney

THE NORRIS PETERS CO., PHOTO-LITHO., WASHINGTON, D. C.

UNITED STATES PATENT OFFICE.

MOLLIE WHEELER, OF ROWLESBURG, WEST VIRGINIA.

COMBINED STAND FOR STRAINERS AND TEA AND COFFEE POTS.

SPECIFICATION forming part of Letters Patent No. 564,462, dated July 21, 1896.

Application filed April 28, 1896. Serial No. 589,476. (No model.)

*To all whom it may concern:*

Be it known that I, MOLLIE WHEELER, a citizen of the United States, residing at Rowlesburg, in the county of Preston and State of West Virginia, have invented certain new and useful Improvements in a Combined Stand for Strainers and Tea and Coffee Pots; and I do declare the following to be a full, clear, and exact description of the invention, such as will enable others skilled in the art to which it appertains to make and use the same.

My invention has relation to combined stands for strainers and tea and coffee pots; and the object of the invention is to provide a convenient and simple device for the family to neatly, cleanly, and conveniently dispense these household beverages on the table at meals; and to these ends the novelty consists in the construction, combination, and arrangement of the same, as will be hereinafter more fully described, and particularly pointed out in the claim.

In the accompanying drawings the same letters of reference indicate like parts of the invention.

Figure 1:
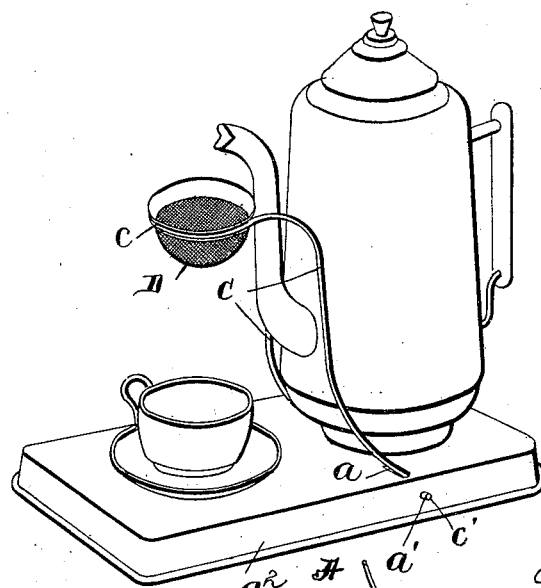
Figure 3:
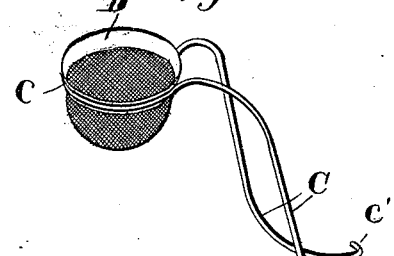
Figure 2:
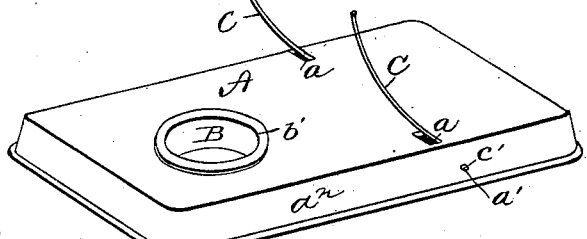
Figure 4:
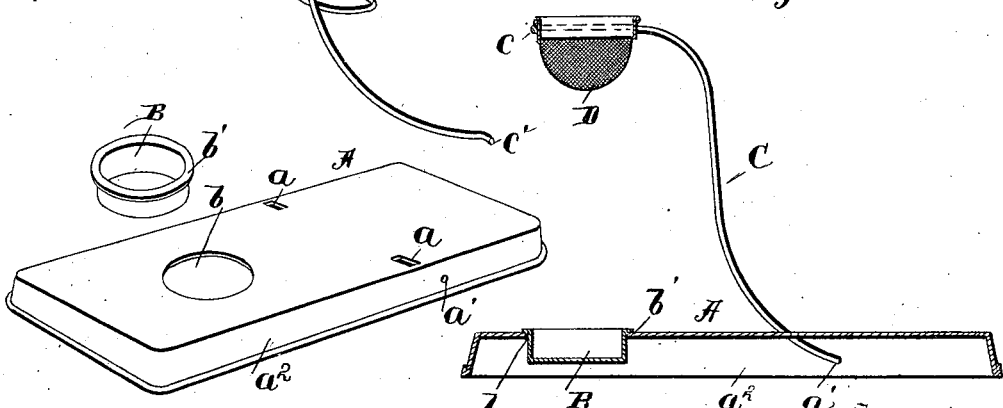

Figure 1 is a perspective view of my improved stand as it appears in use with the tea or coffee pot and cup and saucer in place. Fig. 2 is a similar view with the pot, cup and saucer, and upper part of strainer-bracket removed. Fig. 3 shows the strainer and stand and the drip-pan removed from their places, and Fig. 4 is a longitudinal section of Fig. 2.

A is the base, and is preferably made of a single piece of sheet metal, the transverse slots $a\ a$ and the circular opening $b$ for the drip-pan B being formed at the same time.

C is a curved bracket made of a single piece of spring-wire, formed with a central circular support $c$ to hold the strainer D above the cup and in line with the drip-pan B, and the lower ends of said bracket C terminate in oppositely-projecting studs $c'\ c'$, which pass through the transverse slots $a\ a$ in the base A and enter the orifices $a'\ a'$ in the flange $a^2$ of said base, and, when thus engaged, support the strainer D above the cup, as shown in Fig. 1. After the cup has been filled and removed the pan B catches any drops or drippings from the strainer D. This pan is provided with a concentric flange $b'$, resting upon the base, and the pan itself is detachable to empty its contents or to clean it, and by pressing the lower ends of the bracket C together in the slots $a\ a$ their studs $c'\ c'$ are withdrawn from the orifices $a'\ a'$ and the ends drawn upwardly through the slots to release it from the base. The ends then spring apart, opening circular support $c$ to release the strainer D. When desired, by a reversal of the operation the strainer and bracket is returned to its former position in the base.

The sheet-metal base may be japanned, lacquered, or otherwise finished and decorated to suit the taste and means of the public, and forms a convenient, useful, and ornamental article on any table.

Having thus described my invention, what I claim, and desire to secure by Letters Patent, is—

The combination with the flanged base A, provided with the transverse slots $a\ a$, the orifices $a'\ a'$, and the circular opening $b$, of the removable drip-pan B having a concentric flange $b'$, and the strainer D supported in place by the curved bracket C, the lower ends of which pass through the transverse slots $a\ a$ in the base A, and their oppositely-projecting studs $c'\ c'$ engaging the orifices $a'\ a'$ in the flange $a^2$ of said base, substantially as and for the purpose set forth.

In testimony whereof I hereunto affix my signature in presence of two witnesses.

MOLLIE WHEELER.

Witnesses:
  HUBERT B. CASSEDAY,
  LILLIE HARDESTY.